United States Patent [19]

Morse et al.

[11] 4,021,895

[45] May 10, 1977

[54] SOLAR HEATING

[75] Inventors: Roger Neill Morse, Caulfield; Edward Thomas Davey, Box Hill, both of Australia

[73] Assignee: Commonwealth Scientific and Industrial Research Organization, Campbell, Australia

[22] Filed: June 13, 1974

[21] Appl. No.: 479,065

[30] Foreign Application Priority Data

June 18, 1973  Australia ........................... 3703/73

[52] U.S. Cl. .............................. 126/271; 237/1 A; 126/400
[51] Int. Cl.² ......................................... F24J 3/02
[58] Field of Search ................. 126/270, 271, 400; 237/1 A

[56] References Cited

UNITED STATES PATENTS

| | | | |
|---|---|---|---|
| 1,325,596 | 12/1919 | Trosper | 126/271 |
| 2,202,756 | 5/1940 | Cline | 126/271 |
| 2,277,311 | 3/1942 | Freeman | 126/271 |
| 2,311,579 | 2/1943 | Scott | 126/270 |
| 2,838,043 | 6/1958 | Bliss, Jr. | 126/271 |
| 3,039,453 | 6/1962 | Andrassy | 126/271 |
| 3,898,979 | 8/1975 | Medico, Jr. | 126/271 |
| 3,931,806 | 1/1976 | Hayes | 126/271 |

FOREIGN PATENTS OR APPLICATIONS

| | | | |
|---|---|---|---|
| 1,108,431 | 1/1956 | France | 126/271 |
| 1,529,743 | 6/1968 | France | 126/271 |
| 937,904 | 8/1948 | France | 126/271 |
| 432,996 | 4/1948 | Italy | 126/271 |

*Primary Examiner*—John J. Camby
*Assistant Examiner*—Henry C. Yuen
*Attorney, Agent, or Firm*—Sughrue, Rothwell, Mion, Zinn & Macpeak

[57] ABSTRACT

Method and apparatus for solar heating of a fluid in stages involving solar heaters which maintain good thermal efficiency to differing maximum temperatures in order to provide effective heating over a temperature range wider than could be effectively dealt with by any one type of solar heater.

10 Claims, 3 Drawing Figures

SOLAR HEATING

BACKGROUND OF THE INVENTION

1. Field of the Invention

This invention relates to the heating of fluids such as liquids by means of solar energy. It has particular but not exclusive application to solar water heaters.

2. Description of the Prior Art

The use of solar energy on a large scale is now technologically practicable for industrial process heating and mineral and food proccessing plants where water at temperatures up to 100° C is required. Its more widespread use is inhibited by relatively low cost of fossil fuels and the convenience of natural gas and oil as a primary energy source. The impending energy crisis is likely to change this situation but even at present prices there are many climates throughout the world where solar energy can now compete where skillfully applied. For homes, hotels and medium temperature industrial applications requiring water at up to 55° C there are many successful solar water heating installations and in Australia there is a small but viable water heating industry.

The standard domestic solar water heater in Australia is used both with and without electric or fuel boosting, depending on climatic conditions. The collectors are manufactured typically in units 1220 mm by 610 mm (0.75 m$^2$ in area), and incorporate a selective absorbing surface with a single glass cover. A selective absorbing surface is one which has a higher absorptance than emittance at the radiation wavelength concerned. Such surfaces may be produced by special black-oxide coatings and may typically have an absorptance of 0.8 but an emittance of 0.1 to 0.15 at wavelengths of 0.2 to 2 microns. Such heaters are typically used to heat water from 15° C and losses are about 75 Wm$^{-2}$. At higer water temperatures the losses are normally twice this figure. By using more insulation and double glazing these losses could be reduced but the collector would then cost more and would be less efficient at low temperatures because of the reduction in insolation reaching the absorber plate of the collector. Since low temperature collectors are unsatisfactory at high temperatures and high temperature collectors are both more expensive and less efficient at low temperatures, there will be an optimum operating temperature range for each design of collector.

BRIEF SUMMARY OF THE INVENTION

The present invention provides for solar heating of a fluid in stages involving solar heaters which maintain good thermal efficiency to differing maximum temperatures in order to provide effective heating over a temperature range wider than could be effectively dealt with by any one type of solar heater. More particularly the invention provides a method of heating a fluid comprising passing a fluid successively through a plurality of solar heaters which are exposed to solar radiation and are capable of operation with substantial thermal efficiency over incremental temperature ranges extending to successively greater operating temperatures.

Each solar heater may be comprised of a bank of individual solar collector units or panels connected together in series and/or in parallel.

After passing through one of the solar heaters and before being passed through the succeeding solar heater the fluid may be held in a storage zone.

There may be three or more solar heaters and particularly in the case where said fluid is a liquid, the liquid may be held in different storage zones between passages through different successive pairs of heaters. The storage zones may, however, be zones in a common storage tank. More particularly the zones may be disposed one above the other in a columnar storage tank.

The invention further provides fluid heating apparatus comprising a plurality of solar liquid heaters and fluid flow means to pass fluid successively through them, the solar heaters being constructed to be capable of operation with substantial thermal efficiency over incremental temperature ranges which extend to successively greater temperatures in the direction of fluid flow through them.

The solar heaters may comprise a relatively low temperature heater having at least one collector unit with a non-selective absorber surface and a higher temperature heater having at least one collector unit with a selective absorber surface i.e., a surface with less emittance than absorptance.

The relatively low temperature heater may, for example, have at least one collector unit having an unglazed matt black absorber surface of absorptance and emittance both about 0.9 for radiation wavelengths in the range 0.2 to 2 microns whereas the high temperature heater may have a least one collector unit with a selective absorber surface with an emittance less than 0.4 and as little as 0.1. The high temperature heater would be glazed and insulated.

There may be three or more solar heaters and particularly in the case where the fluid comprises a liquid the apparatus may further comprise liquid storage means having a plurality of liquid storage zones providing for storage of the liquid in different zones between passages through different successive pairs of heaters.

The storage means may comprise a single storage tank and said zones may be different regions of the tank interior located one above the other. More particularly the solar heaters may be simply connected to the tank at different levels to define said zones.

The liquid flow means may be such that liquid is returned to the tank from each heater at the same level as it was withdrawn for passage through that heater.

BRIEF DESCRIPTION OF THE SEVERAL VIEWS OF THE DRAWINGS

In order that the invention may be more fully explained an experimental installation and the manner in which the results of operation of this installation can be applied to the design of other installations will now be described in some detail with reference to the accompanying drawings, in which.

DETAILED DESCRIPTION

Figure 1:
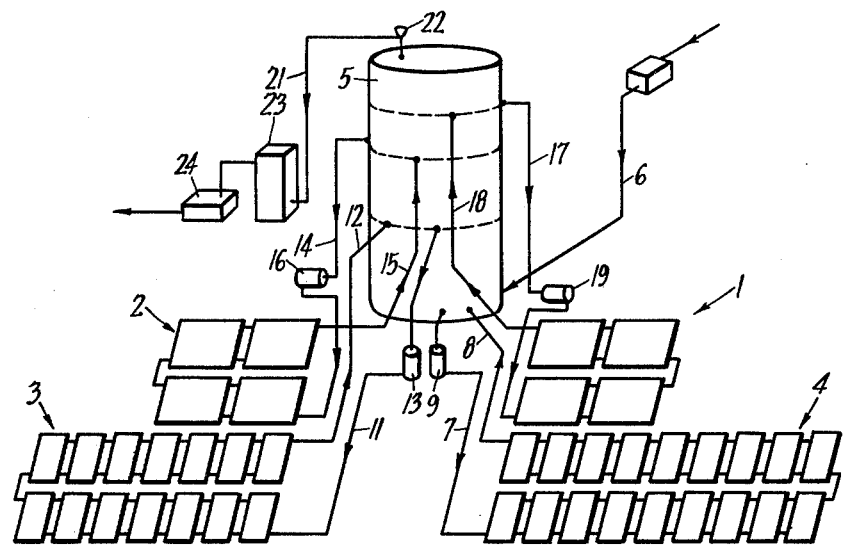
FIG. 1 is a diagrammatic layout of one installation made in accordance with the invention.

The system shown diagrammatically in FIG. 1 comprises four independent solar heaters denoted generally as 1, 2, 3, 4 each consisting of a bank of individual collector units connected in series. These heaters are connected to a common columnar storage tank 5 at different levels to give four temperature zones within the tank.

The solar collector units of the four heaters are of different types. Heater 1 has collectors which are designed for high temperature operation and which will be referred to as Type 1; heater 2 has collectors which are designed for medium-high temperature operation and which will be referred to as Type 2; heater 3 has collectors which are designed for medium temperature operation and which will be referred to as Type 3; and heater 4 has collectors which are designed for low temperature operation and which will be referred to as Type 4.

Figure 2:
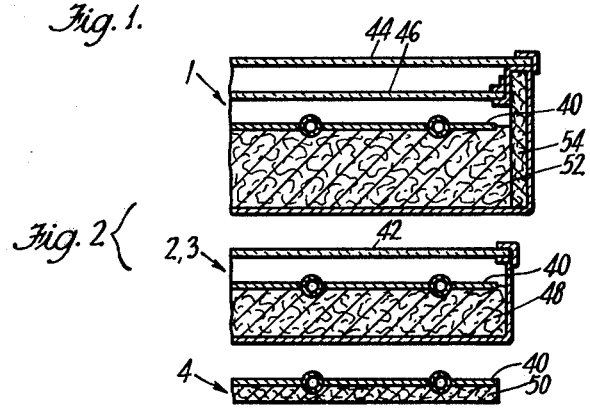
FIG. 2 shows the cross-section of high, medium-high, medium and low temperature collectors included in the installation.

The cross-sectional details of the four types of collectors are shown in FIG. 2. The Type 3 collectors are standard commercial rectangular units with copper absorber plates 40 treated to provide a selective surface and fitted with single glass cover 42 and having 50mm of insulation 48 to the rear thereof. The selective surface may have an absorptance of 0.8 but an emittance of about 0.1 to 0.15 at wave lengths between about 0.2 to 2 microns. The Type 2 collectors are of similar construction but each unit has twice the area making it square. The Type 1 collectors are similar to Type 2 except for double glazing 44, 46 and extra edge insulation 52 and with extra rear insulation 54 of 75mm thickness. The Type 4 collectors have no glass cover or case and consist merely of a standard absorber plate 40 with matt black finish and 12mm of insulation 50 on the rear only. The matt black collector surface may have an absorptance of 0.95 at wave lengths of between about 0.2 to 2 microns but also an emittance of about 0.95 at the same wave lengths.

Cold water is supplied to the bottom of tank 5 via supply pipe 6 and the four solar heaters, 1, 2, 3, 4, are connected to the tank at different heights to give four temperature zones within the tank. More particularly the low temperature heater 4 is connected to the bottom part of the tank via an outflow pipe 7 and a return flow pipe 8. The outflow pipe 7 is fitted with a pump 9 to circulate water from the bottom of the tank through the collectors of heater 4 and thence back into the bottom of the tank. Similarly, heater 3 is connected to the tank at a higher level by an outflow pipe 11 and return flow pipe 12, the outflow pipe being fitted with a circulation pump 13.

Heater 2 is connected to the tank at a yet higher level by an outflow pipe 14 and return flow pipe 15, the outflow pipe being fitted with a circulation pump 16. Heater 1 is connected to the tank at a higher level near to the top of the tank by a outflow pipe 17 and a return flow pipe 18, outflow pipe 17 being fitted with a pump 19.

Since the flow and return connections for each heater are at the same level in the tank, circulation through the four heaters generates a substantially uniform water temperature in each of the four zones thus defined in the tank.

The four heaters 1, 2, 3, 4, may be designed to produce temperature rises of 15° to 20° C each and thus provide an overall rise of 75° C. As shown in FIG. 1 heated water is drawn from the top of the tank via an outlet pipe 21 fitted with an air eliminator 22 and is passed through a boiler 23 to boost the water temperature to a desired temperature T$w$. The flow of water may be measured by passage through a flow measuring tank 24.

Figure 3:
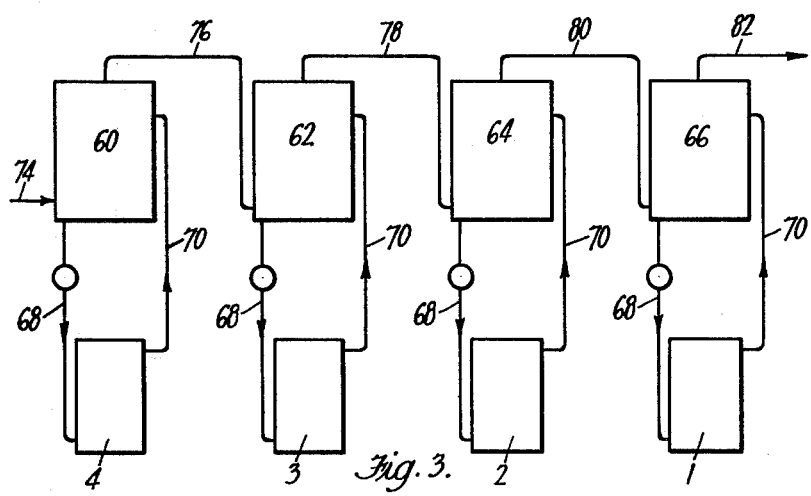
FIG. 3 is a diagrammatic layout of an alternative installation.

Experiments with a four-stage installation of the type shown in FIGS. 1 and 2 have shown that it has a significantly better performance than could any single stage arrangement. This particular installation is advanced only by way of example, however, and it could be varied considerably. For example it is not essential to use a single water storage tank for the various heaters. FIG. 3 illustrates an alternative arrangement in which four separate storage tanks 60, 62, 64, 66 provide the respective water storage zones. The four heaters 1, 2, 3, 4 are separately coupled to respective tanks 60, 62, 64, 66 to heat water in each zone. Thus each heater receives water from a low level of its associated tank via a pipe 68 and the heated water is passed back to that tank by a pipe 70 which enters the tank somewhat below the top thereof. Cold water is passed into the bottom of tank 60 via an inlet pipe 74. Heated water in tank 60 is taken off via a pipe 76 open to the top of the tank and fed to the bottom of tank 62. Tanks 64, 66 are likewise coupled by pipes 78, 80 so that water from upper parts of tanks 62, 64 is fed, respectively, to tanks 64, 66. Outlet of hot water from the system is via an outlet pipe 82 open to the top of tank 66.

Such variations may be made without departing from the spirit and scope of the invention as defined in the appended claims.

We claim:

1. A method of solar heating a fluid stored in a plurality of storage zone means which are fluidly connected to each other in series comprising taking the fluid at a first temperature from a first storage zone means and passing said fluid through a first solar heating means having a first thermal efficiency related to said first temperature to raise the temperature of said fluid to a second temperature higher than said first temperature, returning said fluid at said second temperature to said first storage zone means, taking fluid from said second storage zone means and passing said fluid through a second separate solar heating means independent from said first solar heating means having a second thermal efficiency higher than said first thermal efficiency to raise said fluid to a third temperature higher than said second temperature and returning said fluid at said third temperature to said second storage zone means.

2. A method as set forth in claim 1 wherein each solar heating means is comprised of a bank of individual solar collector units and further comprising circulating the fluid through said units in series within each solar heating means.

3. Liquid heating apparatus comprising a plurality of separate independent solar liquid heating means, liquid storage zone means having a plurality of liquid storage zones fluidly connected to each other in series and means connecting each of said heating means to a separate storage zone, each of said solar liquid heating means having a different insulating and absorbing construction from the others to operate at different thermal efficiencies and different temperature ranges with the thermal efficiencies increasing in the direction of liquid flow.

4. Liquid heating apparatus as set forth in claim 3 wherein one of said solar liquid heating means comprises a relatively low temperature heater having at least one collector unit with a non-selective absorber surface and a second one of said solar liquid heating means comprises a higher temperature heater having at least one collector unit with a selective absorber surface comprising a surface with less emittance than absorptance.

5. Liquid heating apparatus as set forth in claim 4 wherein the collector unit of said relatively low temperature heater has an unglazed matt black absorber surface of absorptance and emittance both about 0.9 for radiation wavelengths in the range 0.2 to 2 microns.

6. Liquid heating apparatus as set forth in claim 4 wherein the collector unit of said high temperature heater has a selective absorber surface with an emittance less than 0.4 and as little as 0.1 and is glazed and insulated.

7. Liquid heating apparatus as set forth in claim 3 wherein said storage zone means is comprised of a single storage tank and said zones are different regions of said tank interior located one above the other.

8. Liquid heating apparatus as set forth in claim 7 wherin the solar liquid heating means are connected to the tank at different levels to define said zones.

9. Liquid heating apparatus as set forth in claim 8 wherein said liquid flow means is arranged so that the liquid is returned to said tank from each heater means in the same zone from which it was withdrawn for passage through that heater means.

10. Liquid heating apparatus as set forth in claim 3 wherein said liquid storage zones are each located in a separate tank.

* * * * *